(12) United States Patent
Zhang et al.

(10) Patent No.: US 11,282,085 B2
(45) Date of Patent: Mar. 22, 2022

(54) METHOD AND DEVICE FOR VEHICLE-BORNE PAYMENT

(71) Applicant: CHINA UNIONPAY CO., LTD., Shanghai (CN)

(72) Inventors: Limin Zhang, Shanghai (CN); Jinzhi Hua, Shanghai (CN); Sishuang Wan, Shanghai (CN); Weiqi Yu, Shanghai (CN); Xiang Liu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 84 days.

(21) Appl. No.: 16/461,220

(22) PCT Filed: Oct. 12, 2017

(86) PCT No.: PCT/CN2017/105901
§ 371 (c)(1),
(2) Date: May 15, 2019

(87) PCT Pub. No.: WO2018/090770
PCT Pub. Date: May 24, 2018

(65) Prior Publication Data
US 2019/0279219 A1  Sep. 12, 2019

(30) Foreign Application Priority Data

Nov. 15, 2016 (CN) .......................... 201611005723.6

(51) Int. Cl.
*G06Q 20/40* (2012.01)
*G07C 5/02* (2006.01)
(Continued)

(52) U.S. Cl.
CPC ......... *G06Q 20/4016* (2013.01); *G06Q 20/34* (2013.01); *G06Q 20/405* (2013.01); *G07C 5/02* (2013.01); *G07C 5/08* (2013.01)

(58) Field of Classification Search
USPC .......................................................... 705/44
See application file for complete search history.

(56) References Cited

U.S. PATENT DOCUMENTS

2011/0112717 A1* 5/2011 Resner .................. G07C 5/085
701/31.4
2015/0379650 A1 12/2015 Theobald

FOREIGN PATENT DOCUMENTS

CN  201289668 Y  8/2009
CN  105023299 A  11/2015
(Continued)

OTHER PUBLICATIONS

World Intellectual Property Organization (WIPO) International Search Report for PCT/CN2017/105901 dated Jan. 18, 2018 5 Pages.

*Primary Examiner* — Ambreen A Alladin
(74) *Attorney, Agent, or Firm* — Anova Law Group, PLLC

(57) ABSTRACT

Disclosed in the present invention are a vehicle-borne payment method and device, relating to the technical field of vehicle-borne security payment. The method includes: receiving a vehicle-borne payment request sent by a vehicle, the vehicle-borne payment request including vehicle identification information; according to the vehicle identification information, after the vehicle is determined as a registered vehicle, obtaining driving attribute data of the vehicle within the current time period, and a vehicle driving strategy of the vehicle; according to the driving attribute data in the current time period, and the vehicle driving strategy, determining a risk level corresponding to the vehicle-borne payment request; and sending the risk level to a transaction platform so that the transaction platform determines whether to make a payment according to the risk level. The vehicle driving strategy is, after the vehicle applies for registration, formed according to driving attribute data in a preset time period. In (Continued)

an embodiment of the present invention, it is ensured that even if a vehicle is stolen or used by others, the transaction platform determines whether to make the payment according to a risk level, thereby ensuring the security of vehicle-borne payment.

17 Claims, 5 Drawing Sheets

(51) Int. Cl.
*G07C 5/08* (2006.01)
*G06Q 20/34* (2012.01)

(56) References Cited

FOREIGN PATENT DOCUMENTS

| | | | |
|---|---|---|---|
| CN | 105659268 A | 6/2016 | |
| CN | 105857247 A | 8/2016 | |
| CN | 106779692 A | 5/2017 | |
| EP | 3035268 A1 * | 6/2016 | ............. G06Q 20/40 |
| EP | 3035268 A1 | 6/2016 | |
| WO | 2016062261 A1 | 4/2016 | |

* cited by examiner

METHOD AND DEVICE FOR VEHICLE-BORNE PAYMENT

This application claims the benefits of Chinese Patent Application No. 201611005723.6, filed with the Chinese Patent Office on Nov. 15, 2016, and entitled "Method and Device for Vehicle-Borne Payment", which is hereby incorporated by reference in its entirety.

FIELD

The present disclosure relates to the field of vehicle-borne payment security technologies and, particularly, to method and device for vehicle-borne payment.

BACKGROUND

Mobile payment, also referred to as payment on a mobile phone, is a service that allows users to use their mobile terminals to pay for goods or services they consume. An enterprise or an individual sends a payment instruction directly or indirectly to a bank or another financial institution through a mobile device, the Internet, or proximity sensing to generate money payment or fund transfer events, thereby realizing the mobile payment function. With mobile payment, the terminal device, the Internet, application providers, and financial institutions are combined to provide the users with financial services such as money payment and fee payment.

Currently, the focus of competition in payment has been shifted to scene competition, in recent years, the domestic automobile market has been growing constantly, and with the increasing popularity of intelligent cars, automobiles have shown great market potential as a payment terminal, and the scope has been expanding.

However in existing technologies, a payment made in a vehicle-borne payment process usually uses a bank card bound with the vehicle owner so that payment can be made by the vehicle without involving complicated operations such as any password, in the event of an abnormality that the vehicle is stolen, the vehicle-borne payment is at risk.

SUMMARY

Embodiments of the present disclosure provide method and device for vehicle-borne payment so as to address the problem in the prior art that payment is typically made in a vehicle-borne payment process using a bank card bound with a vehicle owner so that payment can be made simply with the vehicle without involving any password or other complicated operations, but under the condition the vehicle is stolen or fails, then there may be a risk of vehicle-borne payment.

In a first aspect, an embodiment of the present disclosure provides a vehicle-borne payment method including: receiving a vehicle-borne payment request sent by a vehicle, where the vehicle-borne payment request includes identification information of the vehicle; determining that the vehicle is a registered vehicle, and then obtaining driving attribute data of the vehicle within a current time period and vehicle driving strategies of the vehicle, according to the identification information of the vehicle; determining a risk level corresponding to the vehicle-borne payment request according to the driving attribute data within the current time period, and the vehicle driving strategies; and transmitting the risk level to a transaction platform so that the transaction platform determines whether to make a payment, according to the risk level; where the vehicle driving strategies are created according to driving attribute data within a preset time period after the vehicle applies for registration.

In an embodiment of the present disclosure, the risk level corresponding to the vehicle-borne payment request is determined according to the driving attribute data within the current time period, and the vehicle driving strategies, and the risk level is transmitted to the transaction platform so that the transaction platform determines whether to make the payment, according to the risk level to thereby secure vehicle-borne payment.

Furthermore the determining the risk level corresponding to the vehicle-borne payment request according to the driving attribute data within the current time period, and the vehicle driving strategies includes: for each driving attribute, searching the vehicle driving strategies for a reference strategy value corresponding to a corresponding piece of the driving attribute data within the current time period; determining a risk parameter value of the vehicle-borne payment request according to reference strategy values corresponding to respective pieces of the driving attribute data within the current time period; and determining the risk level corresponding to the vehicle-borne payment request according to the risk parameter value of the vehicle-borne payment request.

In an embodiment of the present disclosure, the reference strategy value of each piece of obtained driving attribute data within the current time period is determined, the risk parameter value is determined according to reference strategy values, and the risk level corresponding to the vehicle-borne payment request is determined according to the risk parameter value, that is, the risk level of vehicle-borne payment is determined according to the plurality of pieces of obtained driving attribute data, and the risk level is calculated according to the multi-dimension attribute data, thus improving the accuracy of the calculated risk level.

Furthermore the method further includes: receiving driving attribute data reported by the vehicle, and storing the driving attribute data reported by the vehicle into a database; and the obtaining the driving attribute data of the vehicle within the current time period includes: obtaining continuous driving attribute data stored in a preset time length before the vehicle-borne payment request is received, from the database.

In an embodiment of the present disclosure, the driving attribute data reported by the vehicle are stored in the database, and the continuous driving attribute data stored in the preset time length before the vehicle-borne payment request is obtained from the database upon reception of the vehicle-borne payment request, thus guaranteeing the accuracy of the obtained attribute data.

Furthermore before determining the risk level corresponding to the vehicle-borne payment request according to the driving attribute data within the current time period, and the vehicle driving strategies, the method further includes: if the continuous driving attribute data stored in the preset time length fail to be obtained from the database, then sending a failure message rejecting the vehicle-borne payment request to the vehicle.

In an embodiment of the present disclosure, when it is determined that the continuous driving attribute data stored in the preset time length fail to be obtained, that is, it is determined to reject the current vehicle-borne payment, then the failure message rejecting the vehicle-borne payment request can be sent to the vehicle to thereby provide security of the vehicle-borne payment.

Furthermore after determining the risk level corresponding to the vehicle-borne payment request according to the driving attribute data within the current time period, and the vehicle driving strategies, the method further includes: if the risk level corresponding to the vehicle-borne payment request is determined as a high-risk level, then determining identification information of a communication terminal bound with the vehicle according to the identification information of the vehicle, and sending a payment security alarm message to the communication terminal bound with the vehicle.

In an embodiment of the present disclosure, when the risk level corresponding to the vehicle-borne payment request is determined as a high-risk level, then the alarm message can be sent to a user of the vehicle to thereby prompt the user with a hidden security risk of payment.

Furthermore the determining that the vehicle is a registered vehicle includes: receiving a registration information sent by the vehicle, where the registration information includes a registered account and a registration password; searching for a reference password corresponding to the registered account according to the registered account; and determining that the vehicle is a registered vehicle, upon determining that the reference password agrees with the registration password.

In an embodiment of the present disclosure, in order to ensure that the vehicle driving attribute data collected within the current time period that is before current vehicle-borne payment corresponds to a correct user, it shall be further confirmed whether the vehicle is a registered vehicle.

Furthermore the driving attribute data within the current time period includes any one or combination of the followings: driving speeds under different road conditions; a frequency at which an air-conditioner is started at different temperature; a time period for which a radio is used; a driving area; or a driving time period.

In an embodiment of the present disclosure, the risk level of the vehicle-borne payment is determined according to various driving attribute data to thereby guarantee the correctness of the determined risk level.

In a second aspect, an embodiment of the present disclosure provides a vehicle-borne payment device including: a receiving unit is configured to receive a vehicle-borne payment request sent by a vehicle, where the vehicle-borne payment request includes identification information of the vehicle; an acquiring unit configured to determine that the vehicle is a registered vehicle, and then obtain driving attribute data of the vehicle in a current time period and vehicle driving strategies of the vehicle, according to the identification information of the vehicle; a risk level determining unit configured to determine a risk level corresponding to the vehicle-borne payment request according to the driving attribute data within the current time period, and the vehicle driving strategies; and a transmitting unit configured to transmit the risk level to a transaction platform so that the transaction platform determines whether to make a payment, according to the risk level. The vehicle driving strategies are created according to driving attribute data within a preset time period after the vehicle applies for registration.

In an embodiment of the present disclosure, the risk level corresponding to the vehicle-borne payment request is determined according to the driving attribute data within the current time period, and the vehicle driving strategies, and the risk level is transmitted to the transaction platform so that the transaction platform determines whether to make payment, according to the risk level, so that even under the condition the vehicle is stolen, or driven by another person than the owner of the vehicle, then the platform will determine whether to make the payment, according to the risk level to thereby secure vehicle-borne payment.

Furthermore the risk level determining unit is configured: for each driving attribute, to search the vehicle driving strategies for a reference strategy value corresponding to a corresponding piece of the driving attribute data within the current time period; to determine a risk parameter value of the vehicle-borne payment request according to reference strategy values corresponding to respective pieces of the driving attribute data within the current time period; and to determine the risk level corresponding to the vehicle-borne payment request according to the risk parameter value of the vehicle-borne payment request.

Furthermore the receiving unit is further configured to receive driving attribute data reported by the vehicle and to store the driving attribute data reported by the vehicle into a database; and the acquiring unit is configured to obtain continuous driving attribute data stored in a preset time length before the vehicle-borne payment request is received, from the database.

Furthermore the risk level determining unit is configured: if the continuous driving attribute data stored in the preset time length fail to be obtained from the database, to send a failure message rejecting the vehicle-borne payment request to the vehicle.

Furthermore the risk level determining unit is configured: if the risk level corresponding to the vehicle-borne payment request is determined as a high-risk level, to determine identification information of a communication terminal bound with the vehicle according to the identification information of the vehicle, and to send a payment security alarm message to the communication terminal bound with the vehicle.

Furthermore the apparatus further includes a registration unit configured to receive a registration information sent by the vehicle, where the registration information includes a registered account and a registration password; to search for a reference password corresponding to the registered account according to the registered account; and to determine that the vehicle is a registered vehicle, upon determining that the reference password agrees with the registration password.

Furthermore the driving attribute data within the current time period includes any one or combination of the followings: driving speeds under different road conditions; a frequency at which an air-conditioner is started at different temperature; a time period for which a radio is used; a driving area; or a driving time period.

In a third aspect, an embodiment of the present disclosure provides an electronic device including: a processor, a memory, a transceiver, and a bus interface, the processor, the memory, and the transceiver being connected with each other via the bus interface, where: the transceiver is configured to receive a vehicle-borne payment request sent by a vehicle, where the vehicle-borne payment request includes identification information of the vehicle; the processor is configured to read and execute program stored in the memory: to determine that the vehicle is a registered vehicle, and then obtain driving attribute data of the vehicle within a current time period and vehicle driving strategies of the vehicle, according to the identification information of the vehicle; and to determine a risk level corresponding to the vehicle-borne payment request according to the driving attribute data within the current time period, and the vehicle driving strategies; where the vehicle driving strategies are created according to driving attribute data within a preset time period after the vehicle applies for registration; the memory is configured to store one or more pieces of executable program, and data for use by the processor in operation; the transceiver is further configured to transmit the risk level to a transaction platform so that the transaction platform determines whether to accept the vehicle-borne payment request, according to the risk level; and the bus interface is configured to provide at least one interface.

In a fourth aspect, an embodiment of the present disclosure provides a non-transitory computer readable storage medium storing computer instructions configured to cause the computer to perform the vehicle-borne payment method according to any one of the embodiments of the present disclosure in the first aspect.

In a fifth aspect, an embodiment of the present disclosure provides a computer program product including computer program stored on a non-transitory computer readable storage medium, where the computer program includes program instructions configured, upon being executed on a computer, to cause the computer to perform the vehicle-borne payment method according to any one of the embodiments of the present disclosure in the first aspect.

In an embodiment of the present disclosure, the risk level corresponding to the vehicle-borne payment request is determined according to the driving attribute data within the current time period, and the vehicle driving strategies, and the risk level is transmitted to the transaction platform so that the transaction platform determines whether to make the payment, according to the risk level, so that even when the vehicle is stolen, or driven by a non-owner of the vehicle, the transaction platform can determine whether to make the payment, according to the risk level to thereby secure vehicle-borne payment.

BRIEF DESCRIPTION OF THE DRAWINGS

In order to more clearly illustrate the technical solutions according to the embodiments of the present application, the drawings used in the description of the embodiments will be briefly described below. Apparently, the drawings in the following description only refer to some embodiments of the present application, and those ordinarily skilled in the art can further derive other drawings from these drawings without any inventive efforts.

DETAILED DESCRIPTION OF THE EMBODIMENTS

In order to make the objects, technical solutions, and advantages of the present disclosure more clear, the present disclosure will be further described below in details with reference to the drawings. Apparently, the embodiments to be described are only a part but all of the embodiments of the present disclosure. Based upon the embodiments of the present disclosure, all of other embodiments which can occur to those ordinarily skilled in the art without any inventive efforts are within the scope of the present disclosure.

Figure 1:
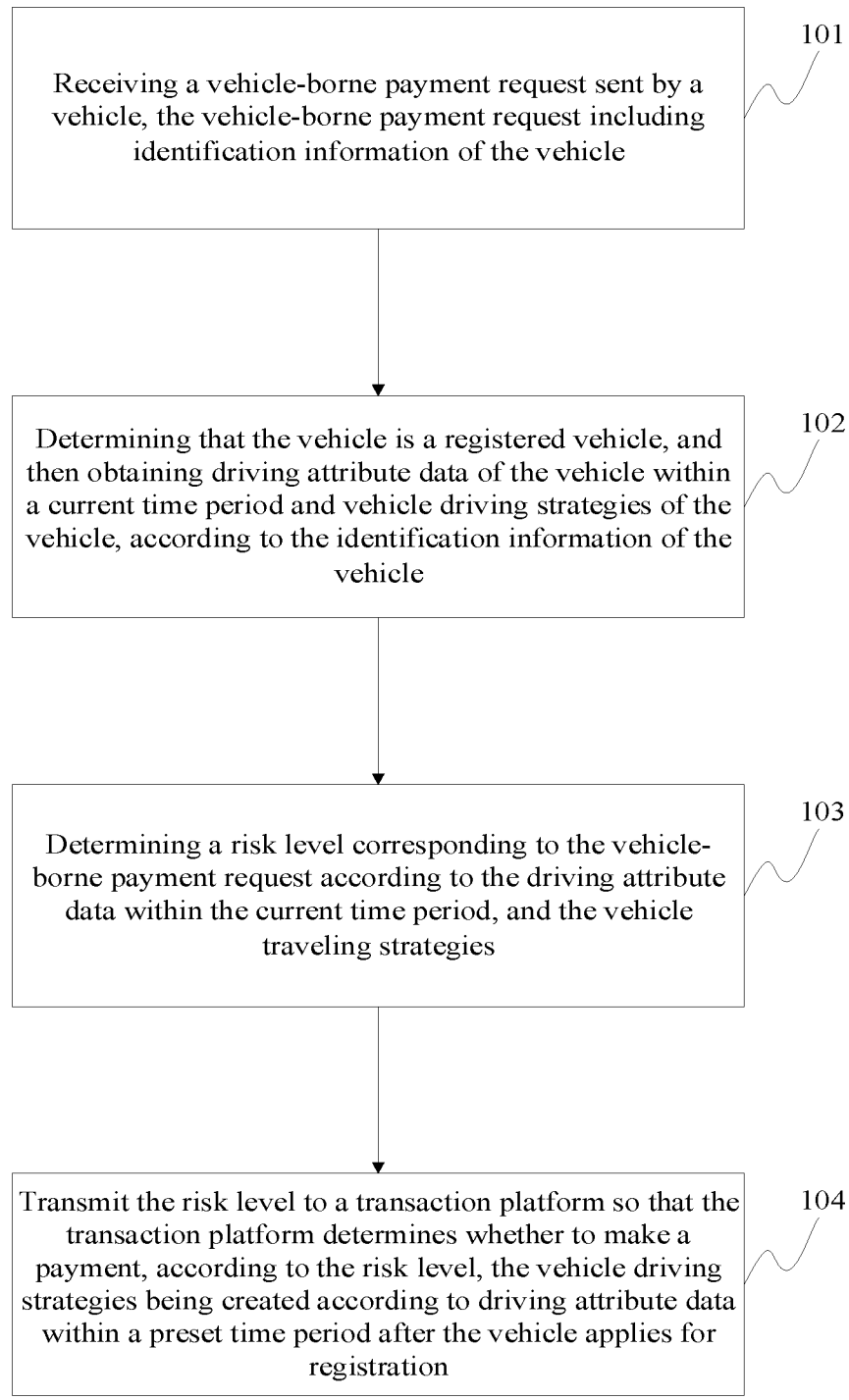
FIG. 1 is a schematic flow chart of a vehicle-borne payment method according to an embodiment of the present application.

As illustrated in FIG. 1, a vehicle-borne payment method is provided according to an embodiment of the present disclosure and includes:

Step 101, receiving a vehicle-borne payment request sent by a vehicle, the vehicle-borne payment request including identification information of the vehicle;

Step 102, according to the identification information of the vehicle, determining that the vehicle is a registered vehicle, and then acquiring driving attribute data of a current time period of the vehicle and a vehicle driving strategies of the vehicle;

Step 103, according to the driving attribute data of the current time period and the vehicle driving strategies, determining a risk level corresponding to the vehicle-borne payment request;

Step 104, transmitting the risk level to a transaction platform so that the transaction platform determines whether to make a payment according to the risk level;

The vehicle traveling strategies are created according to the driving attribute data in a preset time period after the vehicle applies for registration.

Figure 2:
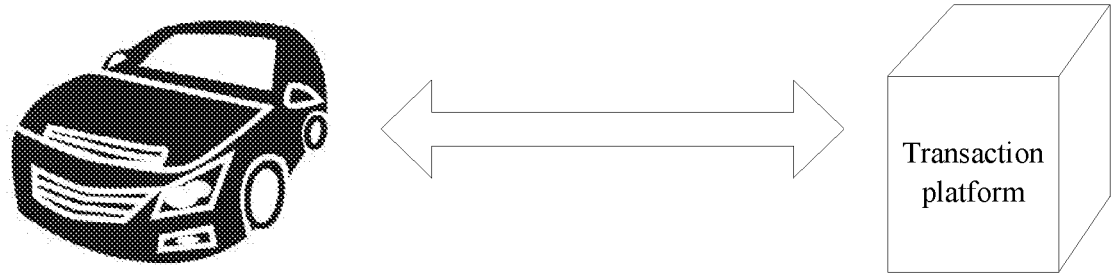
FIG. 2 is a schematic diagram of interaction between a vehicle and a transaction platform according to an embodiment of the present disclosure.

In an embodiment of the present disclosure, as illustrated in FIG. 2, vehicle-borne payment is made between the vehicle and the transaction platform, and in order to ensure security of transactions of the transaction platform, the risk level of the vehicle-borne payment request needs to be evaluated before the vehicle-borne payment request is sent to the transaction platform.

In an embodiment of the present disclosure, the transaction platform may refer to a platform for conducting a financial transaction with a bank, and optionally, in an embodiment of the present disclosure, the transaction platform may refer to a UnionPay transaction platform.

In an embodiment of the present disclosure, an entity implementing the embodiment of the present disclosure can be a hardware device, or can be a software module device, and the entity can be arranged in a link between the vehicle and the transaction platform as illustrated in FIG. 2, or can be arranged in the transaction platform.

In the step 101, after the vehicle needs to make a vehicle-borne payment, the vehicle sends the vehicle-borne payment request including the identification information of the vehicle. In an embodiment of the present disclosure, the identification information of the vehicle refers to a unique ID which can identify the vehicle, and optionally the identification information of the vehicle can be an engine number or license plate information of the vehicle.

Optionally, in an embodiment of the present disclosure, if there are a plurality of transaction platforms, the received vehicle-borne payment request sent by the vehicle can further include identification information of the transaction platform corresponding to the vehicle-borne payment request so that the vehicle-borne payment request can be sent to the corresponding transaction platform after the risk level corresponding to the vehicle-borne payment request is determined.

In the step 102, after receiving the vehicle-borne payment request sent by the vehicle, it is determined whether the vehicle is a registered vehicle.

In an embodiment of the present disclosure, if the owner of vehicle A is user a, driving attributes of the vehicle A can be recorded, that is, user a of the vehicle owner is determined that drives the vehicle A and has the driving attributes of the vehicle A. Since there are a plurality of drivers drive the vehicle A, to ensure the security of the vehicle-borne payment, it is firstly determined whether the vehicle is a registered vehicle.

Optionally in an embodiment of the present disclosure, after each start, the vehicle sends registration information to register and to thereby ensure the security of the vehicle-borne payment.

In an embodiment of the present disclosure, the registration information may be account-password information, for example, upon receiving the registration information sent by the vehicle, the registration information including a registered account and a registration password, a corresponding reference password is determined according to the registered account, and after determining that the registered password is consistent with the reference password, it is determined that the vehicle is a registered vehicle.

Optionally in an embodiment of the present disclosure, the received registration information sent by the vehicle includes a registered account and registered fingerprint information of a user, corresponding pre-stored reference fingerprint information is determined according to the registered account, and the reference fingerprint information can be obtained when the user initializes the driving, when it is determined that the registered fingerprint information of the user is consistent with the reference fingerprint information, it is determined that the vehicle is a registered vehicle.

Optionally, in an embodiment of the present disclosure, when the vehicle is stolen, or driven by a non-owner of the vehicle, when it is determined that the vehicle is an unregistered vehicle according to the registration information of the vehicle, it is determined that the vehicle-borne payment cannot be made.

In the step 102, acquiring driving attribute data of the current time period of the vehicle includes driving attribute data in a preset time period before the vehicle-borne payment request sent by the vehicle is received, and the preset time period can be determined according to configuration information of the owner of the vehicle; and for example, in an embodiment of the present disclosure, the preset time period is 20 minutes, that is, driving attribute data of the vehicle are obtained including data within the 20 minutes before receiving the vehicle-borne payment request.

In an embodiment of the present disclosure, the vehicle driving strategies of the vehicle pre-stored in a database are further obtained according to the identification information of the vehicle. The vehicle driving strategies are created according to the driving attribute data within a preset time period after the vehicle applies for registration, and the preset time period can be determined according to the configuration information of the owner of the vehicle. The vehicle driving strategies represent a driving habit of the owner of the vehicle, e.g., driving speeds under different road conditions, a frequency at which an air-conditioner is used at different temperatures, etc.

In an embodiment of the present disclosure, while driving, the vehicle reports driving attribute data thereof. Optionally in an embodiment of the present disclosure, the driving attribute data includes any one or combination of the following:

driving speeds under different road conditions,
air conditioning usage under different temperature conditions,
radio usage time,
driving area, and
driving time.

For example, in an embodiment of the present disclosure, the vehicle obtains driving speed of the vehicle under traffic conditions such as a congestion or an unblocked traffic. The traffic conditions, such as a congestion or an unblocked traffic, can be obtained by a real-time detection system of road-section information over the Internet.

Of course, in an embodiment of the present disclosure, in addition to the above-mentioned driving attribute data, all attribute data related to the vehicle while driving can further be included, and will not be described herein.

Since the vehicle driving strategies are determined according to the driving attribute data of the vehicle in the preset time period, when a driver is changed while the driving attribute data of the vehicle are being acquired, the vehicle driving strategies may be determined inaccurately.

Accordingly in an embodiment of the present disclosure, optionally the user can control the time period for collecting the driving attribute data, that is, the user can trigger the collection of the driving attribute data at the moment when the user starts driving the vehicle, and stop the collection of the driving attribute data when the user determines not to record driving attribute data any more.

In an embodiment of the present disclosure, the vehicle can report driving attribute data in real time, or can report driving attribute data periodically. Optionally driving attribute data includes time information of respective pieces of driving attribute data. For example, the reported air conditioning usage includes times for using the air conditioner, including e.g., a time point 1, a time point 2, and a time point 3. Weather information corresponding to the time point 1, the time point 2, and the time point 3 is retrieved over the Internet to thereby determine the use condition of the air conditioner.

In the step 103, according to the obtained driving attribute data and the vehicle driving strategies created in the preset time period, the risk level corresponding to the vehicle-borne payment request can be determined.

In an embodiment of the present disclosure, if the driving attribute data within the current time period belongs to a frequent driving strategy used by the owner among the vehicle driving strategies, it is determined that the risk level corresponding to the vehicle-borne payment request is low; and if the driving attribute data within the current time period belongs to an infrequent driving strategy used by the owner among the vehicle driving strategies, it is determined that the risk level corresponding to the vehicle-borne payment request is high.

Optionally in an embodiment of the present disclosure, according to the driving attribute data in the current time period and the vehicle driving strategies, determining the risk level corresponding to the vehicle-borne payment request includes:

for each driving attribute, searching the vehicle driving strategies for a reference strategy value corresponding to a corresponding piece of the driving attribute data within the current time period;

determining a risk parameter value of the vehicle-borne payment request according to reference strategy values corresponding to respective pieces of the driving attribute data within the current time period; and determining the risk level corresponding to the vehicle-borne payment request according to the risk parameter value of the vehicle-borne payment request.

For example, when the driving attribute data within the current time period includes driving speeds of the vehicle under different road conditions, and a frequency at which an air-conditioner is used at different temperatures, firstly the vehicle driving strategy is found from driving strategies according to the driving speeds of the vehicle under different road conditions, and reference strategy values corresponding to the reported driving speeds of the vehicle under respective road conditions are determined; and in an embodiment of the present disclosure, a reference strategy value corresponding to an obtained driving speed of the vehicle under each different road condition can be found in the vehicle driving strategies.

The risk parameter value of the vehicle-borne payment request can be determined according to the respective reference strategy values, and optionally the risk parameter value can be determined by a sum of the respective reference strategy values, or different weights can be set for different driving attributes with different importance factors, and the risk parameter value of the vehicle-borne payment request can be determined by the weighted sum of the respective reference strategy values.

If the determined risk parameter value is greater than a preset high-risk threshold, the risk level of the vehicle-borne payment request is determined as a high-risk level; and if the determined risk parameter value is less than a preset low-risk threshold, the risk level of the vehicle-borne payment request is determined as a low-risk level.

In the step 104, after the risk level of the vehicle-borne payment request is determined, the risk level is transmitted to the transaction platform, and the transaction platform determines whether to accept the vehicle-borne payment request, according to the risk level.

Optionally in an embodiment of the present disclosure, in order to facilitate those skilled in the art to understand the process above of determining the vehicle driving strategies according to driving attribute data of the vehicle within a preset time period, an example thereof will be given below.

In an embodiment of the present disclosure, the user chooses to collect driving attribute data within 20 days, and obtains driving attribute data of the vehicle within 20 days.

Firstly according to time information included in reported driving speeds of the vehicle, road conditions of the road sections corresponding to different time information are obtained over the Internet, so driving speeds of driving the vehicle by the owner under different road conditions can be determined.

For example, under a congestion road condition, 80% of the obtained vehicle speed data is between 20 km/h and 40 km/h; and under an unblocked road condition, 75% of the obtained vehicle speed data is between 60 km/h and 75 km/h, so driving strategies for speeds of driving the vehicle by the user can be determined under the two road conditions.

Optionally in an embodiment of the present disclosure, in the driving strategies for speeds of driving the vehicle by the owner, different ranges of driving speeds are set under each road condition, and a reference strategy value corresponds to each range of driving speeds; and for example, when there is a congestion road condition, different reference strategy values correspond to the different ranges of vehicle driving speeds as depicted in Table 1.

TABLE 1

| Different ranges of vehicle driving speeds corresponding to different reference strategy values ||
| --- | --- |
| Range of driving speeds | Reference strategy value |
| ≤20 km/h | 0.15 |
| 20 km/h-40 km/h | 0.65 |
| 40 km/h-60 km/h | 0.1 |
| 60 km/h-80 km/h | 0.08 |
| ≥80 km/h | 0.02 |

Optionally in an embodiment of the present disclosure, the driving speeds of driving the vehicle by the owner under different road conditions in 20 days are counted, the distribution of these driving speeds satisfies a normal distribution, a confidence interval is set, a reference strategy value of a driving speed set in the confidence interval is set to be value a, and a reference strategy value of a driving speed set out of the confidence interval is set to value b.

Of course, in an embodiment of the present disclosure, the reference strategy values can alternatively be determined otherwise, although a repeated description thereof will be omitted herein.

Other vehicle driving strategies can be formed similarly, so a repeated description thereof will be omitted here. As such, a vehicle driving strategy corresponding to each driving attribute can be determined according to the reported driving attribute data within the preset time period, so that a set of strategies which are corresponding to the respective pieces of the driving attribute data is determined as the vehicle driving strategies. In order to make vehicle-borne payment, the driving attribute data of the vehicle within the current time period are obtained; for each piece of the driving attribute data of the vehicle within the current time period, firstly a corresponding driving strategy is determined, and a reference strategy value in the corresponding driving strategy is determined; and the risk parameter value is determined according to reference strategy values corresponding to respective driving attributes.

In an embodiment of the present disclosure, when the obtained driving attribute data within the current time period does not satisfy a condition of continuous driving attribute data within the preset time period, it is determined that the current vehicle-borne payment evaluation is unsuccessful and a failure message rejecting the vehicle-borne payment request is sent to the vehicle, so that the vehicle can select another payment scheme.

For example, in an embodiment of the present disclosure, the preset time length is 10 minutes, that is, driving attribute data within the time length of 10 minutes are acquired continuously, but the obtained driving attribute data are data acquired continuously in 5 minutes before the vehicle-borne payment request is received, so the obtained driving attribute data cannot be used for calculating the risk level.

Optionally, in an embodiment of the present disclosure, for example, N pieces of driving attribute data within the current time period are obtained, and there are M vehicle driving strategies, where M is greater than or equal to N. Preset time lengths specified for the M vehicle driving strategies may be different from each other, that is, among the N pieces of driving attribute data, there are driving attribute data satisfying a condition of being continuously within a first preset time length, and there are also attribute data unsatisfying a condition of being continuously within a second preset time length, so the driving attribute data recorded continuously in the first preset time length can be selected for determining a reference strategy value.

In the step 104, when the risk level corresponding to the vehicle-borne payment request is determined as a high-risk level, identification information of a communication terminal bound with the vehicle is determined according to the identification information of the vehicle, and a payment security alarm message is transmitted to the communication terminal bound with the vehicle.

In an embodiment of the present disclosure, the identification information of a vehicle is bound with a communication terminal corresponding to the identification information of the vehicle, and for example, the licensed plate number of the vehicle is XA64IP8, and a contact mode of the owner of the vehicle is T, so the licensed plate of the vehicle is bound with T, and when it is determined that the current vehicle-borne payment is at a high-risk level, a payment security alarm message is transmitted to the communication terminal of the owner according to T.

Figure 3:
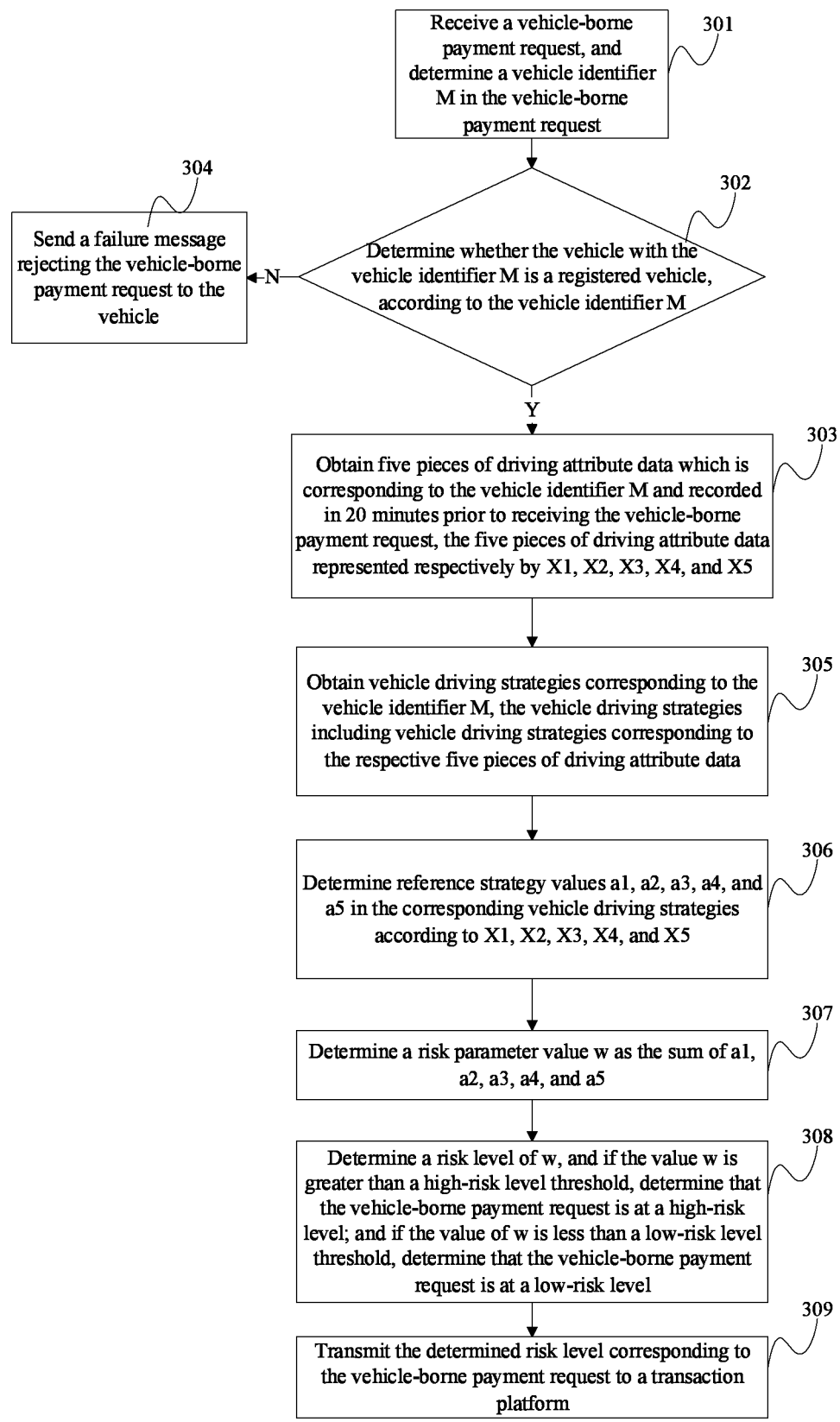
FIG. 3 is a schematic flow chart of a vehicle-borne payment method according to an embodiment of the present disclosure.

In order to facilitate those skilled in the art to understand the present disclosure, the vehicle-borne payment method according to an embodiment of the present disclosure will be described herein as an example, and as illustrated in FIG. 3, in an embodiment of the present disclosure, the vehicle driving strategies include driving strategies corresponding to five different pieces of driving attribute data, all the obtained five pieces of driving attribute data are continuously within a preset length of the current time period, and the current time period is 20 minutes prior to the reception of the vehicle-borne payment request. The method includes the following:

Step 301, receiving a vehicle-borne payment request, and determining a vehicle identifier M in the vehicle-borne payment request.

Step 302, determining whether the vehicle with the vehicle identifier M is a registered vehicle, according to the vehicle identifier M, and if yes, proceeding to the step 303; otherwise, proceeding to the step 304.

Step 303, obtaining five pieces of driving attribute data which is corresponding to the vehicle identifier M and within 20 minutes prior to receiving the vehicle-borne payment request, where the five pieces of driving attribute data are represented respectively as X1, X2, X3, X4, and X5, and proceeding to the step 305.

Step 304, sending a failure message rejecting the vehicle-borne payment request to the vehicle.

Step 305, obtaining vehicle driving strategies corresponding to the vehicle identifier M, where the vehicle driving strategies include vehicle driving strategies corresponding to the respective five pieces of driving attribute data.

Step 306, determining reference strategy values a1, a2, a3, a4, and a5 in the corresponding vehicle driving strategies according to X1, X2, X3, X4, and X5.

Step 307, determining a risk parameter value w to be a sum of a1, a2, a3, a4, and a5.

Step 308, determining a risk level of w, and if the value w is greater than a high-risk level threshold, determining that the vehicle-borne payment request is at a high-risk level; and if the value w is less than a low-risk level threshold, determining that the vehicle-borne payment request is at a low-risk level.

Step 309, transmitting the determined risk level corresponding to the vehicle-borne payment request to a transaction platform.

Figure 4:
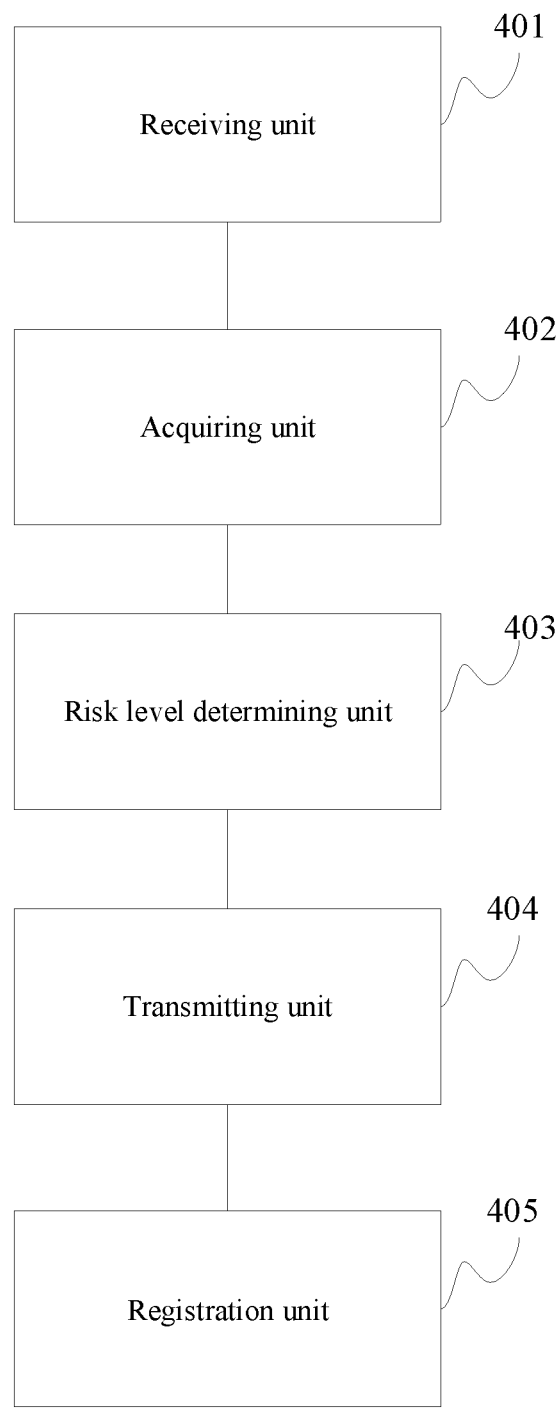
FIG. 4 is a schematic structural diagram of a vehicle-borne payment device according to an embodiment of the present disclosure.

Based upon the same inventive concept, an embodiment of the present disclosure further provides a vehicle-borne payment device as illustrated in FIG. 4, including the following.

A receiving unit 401 is configured to receive a vehicle-borne payment request sent by a vehicle, where the vehicle-borne payment request includes identification information of the vehicle.

An acquiring unit 402 is configured to determine that the vehicle is a registered vehicle, and then acquire driving attribute data of the vehicle in a current time period and vehicle driving strategies of the vehicle, according to the identification information of the vehicle.

A risk level determining unit 403 is configured to determine a risk level corresponding to the vehicle-borne payment request according to the driving attribute data in the current time period, and the vehicle driving strategies of the vehicle s.

A transmitting unit 404 is configured to transmit the risk level to a transaction platform so that the transaction platform determines whether to make payment, according to the risk level.

The vehicle driving strategies are created according to driving attribute data in a preset time period after the vehicle applies for registration.

Furthermore the risk level determining unit 403 is configured: for each driving attribute, to search the vehicle driving strategies for a reference strategy value corresponding to a corresponding piece of the driving attribute data within the current time period; to determine a risk parameter value of the vehicle-borne payment request according to reference strategy values corresponding to respective pieces of the driving attribute data within the current time period; and to determine the risk level corresponding to the vehicle-borne payment request according to the risk parameter value of the vehicle-borne payment request.

Furthermore the receiving unit 401 is further configured to receive driving attribute data reported by the vehicle, and to store the driving attribute data reported by the vehicle into a database.

The acquiring unit 402 is configured to obtain continuous driving attribute data stored in a preset time length before the vehicle-borne payment request is received, from the database.

Furthermore the risk level determining unit 403 is configured: if the continuous driving attribute data stored in the preset time length fail to be obtained from the database, to send a failure message rejecting the vehicle-borne payment request to the vehicle.

Furthermore the risk level determining unit 403 is configured: if the risk level corresponding to the vehicle-borne payment request is determined as a high-risk level, to determine identification information of a communication terminal bundled with the vehicle according to the identification information of the vehicle, and to send a payment security alarm message to the communication terminal bound with the vehicle.

Furthermore the apparatus further includes a registration unit 405 is configured: to receive a registration information sent by the vehicle, where the registration information includes a registered account and a registration password; to search for a reference password corresponding to the registered account; and to determine that the vehicle is a registered vehicle, upon determining that the reference password is consistent with the registration password.

Furthermore the driving attribute data in the current time period includes any one or combination of the following:

driving speeds under different road conditions,
air conditioning usage under different temperatures,
radio usage time,
driving area, and
driving time.

Figure 5:
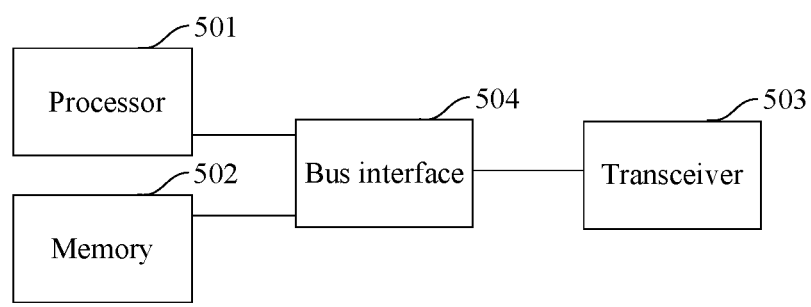
FIG. 5 is a schematic structural diagram of an electronic device according to an embodiment of the present disclosure.

Based upon the same inventive concept, an embodiment of the present disclosure further provides an electronic device as illustrated in FIG. 5, including a processor 501, a memory 502, a transceiver 503, and a bus interface 504, where the processor 501, the memory 502, and the transceiver 503 are connected with each other via the bus interface 504.

The transceiver 503 is configured to receive a vehicle-borne payment request sent by a vehicle, where the vehicle-borne payment request includes the identification information of the vehicle.

The processor 501 is configured to read and execute program in the memory: to determine that the vehicle is a registered vehicle, and then obtain driving attribute data of the vehicle within a current time period and vehicle driving strategies of the vehicle, according to the identification information of the vehicle; and to determine a risk level corresponding to the vehicle-borne payment request according to the driving attribute data within the current time period, and the vehicle driving strategies; where the vehicle driving strategies are created according to driving attribute data within a preset time period after the vehicle applies for registration.

The memory 502 is configured to store one or more executable programs, and store data for use by the processor in operation.

The transceiver 503 is further configured to transmit the risk level to a transaction platform so that the transaction platform determines whether to accept the vehicle-borne payment request, according to the risk level.

The bus interface 504 is configured to provide at least one interface.

Furthermore the processor 501, configured to determine the risk level corresponding to the vehicle-borne payment request according to the driving attribute data within the current time period, and the vehicle driving strategies, is configured: for each driving attribute, to search the vehicle driving strategies for a reference strategy value corresponding to a corresponding piece of the driving attribute data within the current time period; to determine a risk parameter value of the vehicle-borne payment request according to the reference strategy values corresponding to respective pieces of the driving attribute data within the current time period; and to determine the risk level corresponding to the vehicle-borne payment request according to the risk parameter value of the vehicle-borne payment request.

Furthermore the processor 501 is further configured: to receive driving attribute data reported by the vehicle through the transceiver, and to store the driving attribute data reported by the vehicle into a database; and to obtain continuous driving attribute data stored in a preset time length before the vehicle-borne payment request is received, from the database.

Furthermore, before determining the risk level corresponding to the vehicle-borne payment request according to the driving attribute data within the current time period, and the vehicle driving strategies, the processor 501 is further configured: if the continuous driving attribute data stored in the preset time length fail to be obtained from the database, to send a failure message rejecting the vehicle-borne payment request to the vehicle.

Furthermore, after determine the risk level corresponding to the vehicle-borne payment request according to the driving attribute data in the current time period, and the vehicle driving strategies, the processor 501 is further configured: if the risk level corresponding to the vehicle-borne payment request is determined as a high-risk level, to determine identification information of a communication terminal bound with the vehicle according to the identification information of the vehicle, and to send a payment security alarm message to the communication terminal bound with the vehicle through the transceiver 503.

Furthermore the processor 501 configured to determine that the vehicle is a registered vehicle is configured: to receive registration information sent by the vehicle through the transceiver 503, the registration information including a registered account and a registration password; to search for a reference password corresponding to the registered account according to the registered account; and to determine that the vehicle is a registered vehicle, upon determining that the reference password is consistent with the registration password.

Furthermore the driving attribute data within the current time period includes any one or combination of the following:
driving speeds under different road conditions,
air conditioning usage under different temperature conditions,
radio usage time,
driving area, and
driving time.

An embodiment of the present disclosure provides a non-transitory computer readable storage medium for storing computer instructions configured to cause a computer to perform the vehicle-borne payment method according to any one of the implementations of an embodiment of the present disclosure.

An embodiment of the present disclosure provides a computer program product including computer programs stored on a non-transitory computer readable storage medium, the computer program including program instructions configured, upon being executed on a computer, to cause the computer to perform the vehicle-borne payment method according to any one of the implementations of an embodiment of the present disclosure.

Those skilled in the art shall appreciate that the embodiments of the present disclosure can be provided as a method, a system or a computer program product. Therefore the present disclosure can be embodied in the form of an all-hardware embodiment, an all-software embodiment or an embodiment of software and hardware in combination. Furthermore the present disclosure can be embodied in the form of a computer program product embodied in one or more computer useable storage mediums (including but not limited to a disk memory, a CD-ROM, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present disclosure have been described, those skilled in the art benefiting from the underlying inventive concept can make additional modifications and variations to these embodiments. Therefore, the appended claims are intended to be construed as encompassing the preferred embodiments and all the modifications and variations coming into the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

What is claimed is:

1. A vehicle-borne payment, method implemented by a hardware device, the hardware device being a vehicle-borne payment device, comprising:
   receiving, by the hardware device, a vehicle-borne payment request sent by a vehicle requesting a vehicle-borne payment, wherein the vehicle-borne payment request comprises identification information of the vehicle;
   determining, by the hardware device, that the vehicle is a registered vehicle, and then acquiring, by the hardware devices, N pieces of driving attribute data of the vehicle within a current time period, according to the identification information of the vehicle, wherein the current time period is a time period that the driving attribute data has been acquired continuously before the vehicle-borne payment request is received, N being an integer greater than 1;
   acquiring, M vehicle driving strategies of the vehicle created according to N M pieces of driving attribute data within a preset time period after the vehicle applies for registration, the M driving strategies reflecting driving habits of an owner of the vehicle, M being greater than or equal to N;
   when a length of the current time period is shorter than a preset length, determining that an evaluation of a risk level corresponding to the vehicle-borne payment request is unsuccessful and rejecting the vehicle-borne payment request;
   when the length of the current time period is not shorter than the preset length, determining, by the hardware device, the risk level corresponding to the vehicle-borne payment request, according to the N pieces of driving attribute data within the current time period, and the M driving strategies, including:
      determining that multiple pieces of the N pieces of driving attribute data in the current time period satisfy preset time lengths specified by corresponding driving strategies;
      obtaining, from the M vehicle driving strategies, multiple driving strategies respectively corresponding to the multiple pieces of driving attribute data in the current time period;
      determining reference strategy value in the corresponding multiple driving strategies according to the multiple pieces of driving attribute data;
      determining a sum of the reference strategy values as a risk parameter value; and
      determining the risk level by comparing the risk parameter value with a high-risk level threshold and a low-risk level threshold;
   transmitting, by the hardware device, the vehicle-borne payment request and the risk level to the transaction platform; and
   determining, by the transaction platform, whether to accept the vehicle-borne payment request and/or make the vehicle-borne payment between the vehicle and the transaction platform according to the risk level.

2. The method according to claim 1, further comprising:
   receiving driving attribute data reported by the vehicle, and storing the driving attribute data reported by the vehicle in a database; and
   wherein acquiring the N pieces of driving attribute data of the vehicle within the current time period comprises:
      when the length of the current time period is not shorter than the preset length, obtaining, from the database, continuous driving attribute data of the preset length stored before the vehicle-borne payment request is received.

3. The method according to claim 1, before determining the risk level, further comprising:
   determining that the length of the current time period is shorter than the preset length if a time length corresponding to the continuous driving attribute data stored in the database before the vehicle-borne payment request is received is shorter than the preset length.

4. The method according to claim 1, after determining the risk level, further comprising:
   if the risk level corresponding to the vehicle-borne payment request is determined as a high-risk level that is greater than the high-risk threshold, determining identification information of a communication terminal bound with the vehicle and associated with a vehicle owner according to the identification information of the vehicle, and sending a payment security alarm message to the communication terminal.

5. The method according to claim 1, wherein determining that the vehicle is the registered vehicle comprises:
   receiving registration information sent by the vehicle, wherein the registration information comprises a registered account and a registration password;
   determining a reference password according to the registered account; and determining that the vehicle is a registered vehicle, upon determining that the reference password is consistent with the registration password.

6. The method according to claim 1, wherein the driving attribute data within the current time period comprises one or more of the following:
   driving speeds under different road conditions,
   air conditioning usage under different temperatures,
   a radio usage time,
   a driving area, and
   a driving time.

7. An electronic device that communicates between a vehicle and a transaction platform, comprising:
   a processor, a memory, a transceiver, and a bus interface, the processor, the memory, and the transceiver being connected with each other via the bus interface, wherein:
   the transceiver is considered to receive a vehicle-borne payment request sent by the vehicle requesting a vehicle-borne payment, wherein the vehicle-borne payment request comprises identification information of the vehicle;
   the processor is configured to read and execute programs stored in the memory:
     to determine that the vehicle is a registered vehicle, and then obtain N pieces of driving attribute data of the vehicle within a current time period, according to the identification information of the vehicle, wherein the current time period is a time period that the driving attribute data has been acquired continuously before the vehicle-borne payment is received, N being an integer greater than 1;
     to acquire M vehicle driving strategies of the vehicle created according to N pieces of driving attribute data within a preset time period after the vehicle applies for registration, the M vehicle driving strategies reflecting driving habits of an owner of the vehicle, M being greater than or equal to N;
     to determine, when a length of the current time period is shorter than a preset length, that an evaluation of a risk level corresponding to the vehicle-borne payment request is unsuccessful and to reject the vehicle-borne payment request; and
     to determine, when the length of the current time period is not shorter than the preset length, the risk level corresponding to the vehicle-borne payment request according to the N places of driving attribute data within the current time period and the M vehicle driving strategies, including:
     determining that multiple pieces of the N pieces of driving attribute data in the current time period satisfy preset time lengths specified by corresponding driving strategies;
     obtaining, from the M vehicle driving strategies, multiple driving strategies respectively corresponding to the multiple pieces of driving attribute data in the current time period;
     determining reference strategy values in the corresponding multiple driving strategies according to the multiple pieces of driving attribute data;
     determining a sum of the reference strategy values as a risk parameter value; and
     determining the risk level by comparing the risk parameter values with a high-risk level threshold and a low-risk level threshold;
   the memory is configured to store one or more executable programs, and data for use by the processor in operation;
   the transceiver is further configured to transmit the vehicle-borne payment request and the risk level to the transaction platform so that the transaction platform determines whether to accept the vehicle-borne payment request, according to the risk level; and
   the bus interface is configured to provide at least one interface.

8. The device according to claim 7, wherein the processor is further configured:
   to receive driving attribute data reported by the vehicle through the transceiver, and to store the driving attribute data reported by the vehicle in a database; and
   to obtain, from the database, when the length of the current time period is not shorter than preset length, continuous driving attribute data of the preset length stored before the vehicle-borne payment request is received.

9. The device according to claim 7, wherein before the risk level is determined, the processor is further configured:
   to determine that the length of the current time period is shorter than the preset length if a time length corresponding to the continuous driving attribute data stored in the database before the vehicle-borne payment request is received is shorter than the preset length.

10. The device according to claim 7, wherein after the risk level is determined, the processor is further configured:
    if the risk level corresponding to the vehicle-borne payment request is determined as a high-risk level that the risk level is greater than the high-risk threshold, to determine identification information of a communication terminal bound with the vehicle and associated with a vehicle owner according to the identification information of the vehicle, and to send a payment security alarm message to the communication terminal bound with the vehicle through the transceiver.

11. The device according to claim 7, wherein when determining that the vehicle is the registered vehicle, the processor is configured:
    to receive a registration information sent by the vehicle through the transceiver, wherein the registration information comprises a registered account and a registration password;
    to determine a reference password according to the registered account; and
    to determine that the vehicle is a registered vehicle, upon determining that the reference password is consistent with the registration password.

12. A non-transitory computer readable storage medium storing computer instructions thereon configured to cause a hardware device including a computer to perform a vehicle-borne payment method comprising:
    receiving, by the hardware device, a vehicle-borne payment request sent by a vehicle requesting a vehicle-borne payment, wherein the vehicle-borne payment request comprises identification information of the vehicle;
    determining, by the hardware device, that the vehicle is a registered vehicle and then acquiring, by the hardware device, N pieces of driving attribute data of the vehicle within a current time period, according to the identification information of the vehicle, wherein the current time period is a time period that the driving attribute data has been acquired continuously before the vehicle-borne payment request is received, N being an integer greater than 1;

acquiring M vehicle driving strategies of the vehicle created according to N pieces of driving attribute data within a preset time period after the vehicle applies for registration, the M driving strategies reflecting driving habits of an owner of the vehicle, M being greater than or equal to N;

when a length of the current time period is shorter than a preset length, determining than an evaluation of a risk level corresponding to the vehicle-borne payment request is unsuccessful and rejecting the vehicle-borne payment request;

when the length of the current time period is not shorter than the preset length, determining, by the hardware device, the risk level corresponding to the vehicle-borne payment request, according to the N pieces of driving attribute data within the current time period, and the M driving strategies, including:

determining that multiple pieces of the N pieces of driving attribute data in the current time period satisfy preset time lengths specified by corresponding driving strategies;

obtaining, from the M vehicle driving strategies, multiple driving strategies respectively corresponding to the multiple pieces of driving attribute data in the current time period;

determining reference strategy values in the corresponding multiple driving strategies according to the multiple pieces of driving attribute data;

determining a sum of the reference strategy values as a risk parameter value; and determining the risk level by comparing the risk parameter value with a high-risk level threshold and a low-risk level threshold;

transmitting, by the hardware device, the vehicle-borne payment request and the risk level to the transaction platform; and determining, by the transaction platform, whether to accept the vehicle-borne payment request and/or make the vehicle-borne payment between the vehicle and the transaction platform according to the risk level.

13. The method according to claim 1, wherein the driving attribute data within the current time period comprises one or more of the following:
    driving speeds under different road conditions,
    air conditioning usage under different temperatures,
    a radio usage time,
    a driving area, and
    a driving time.

14. The device according to claim 7, wherein the driving attribute data within the current time period comprises one or more of the following:
    driving speeds under different road conditions,
    air conditioning usage under different temperatures,
    a radio usage time,
    a driving area, and
    a driving time.

15. The method according to claim 1, wherein the hardware device is arranged in a link between the vehicle and the transaction platform or is arranged in the transaction platform.

16. The method according to claim 1, wherein determining the risk level comprises:
    determining that the risk level is low, when the driving attribute data within the current time period is consistent with a frequent driving strategy used by the vehicle owner among the vehicle driving strategies created according to the driving attribute data within the preset time period; and
    determining that the risk level is high, when the driving attribute data within the current time period is consistent with an infrequent driving strategy used by the vehicle owner among the vehicle driving strategies created according to the driving attribute data within the preset time period.

17. The method according to claim 1, wherein
    each of the M vehicle driving strategies having a corresponding preset time length, the length of the current time period being not shorter than a first preset time length corresponding to a first vehicle driving strategy, and shorter than a second preset time length corresponding to a second vehicle driving strategy, M being greater than or equal to N; and
    a first piece of driving attribute data recorded within the first preset time length is selected for determining the risk level according to the first vehicle driving strategy.

* * * * *